(12) United States Patent
Lewak et al.

(10) Patent No.: US 11,989,296 B2
(45) Date of Patent: May 21, 2024

(54) PROGRAM EXECUTION ANOMALY DETECTION FOR CYBERSECURITY

(71) Applicant: CYBERSENTRY.AI, INC., Rancho Santa Fe, CA (US)

(72) Inventors: Stanislaw Maria Aleksander Lewak, North Palm Beach, FL (US); Waclaw Tomasz Sierek, Bolechowice (PL); Ian Philip Beeby, New Ross (IE)

(73) Assignee: CYBERSENTRY.AI, INC., Rancho Santa Fe, CA (US)

( * ) Notice: Subject to any disclaimer, the term of this patent is extended or adjusted under 35 U.S.C. 154(b) by 0 days.

(21) Appl. No.: 18/485,049

(22) Filed: Oct. 11, 2023

(65) Prior Publication Data

US 2024/0126881 A1    Apr. 18, 2024

Related U.S. Application Data

(60) Provisional application No. 63/415,852, filed on Oct. 13, 2022.

(51) Int. Cl.
  *G06F 21/00*    (2013.01)
  *G06F 21/56*    (2013.01)

(52) U.S. Cl.
  CPC ...... *G06F 21/566* (2013.01); *G06F 2221/034* (2013.01)

(58) Field of Classification Search
  CPC ................... G06F 21/566; G06F 2221/034
  See application file for complete search history.

(56) References Cited

U.S. PATENT DOCUMENTS

| 9,942,268 B1* | 4/2018 | Danileiko ........... H04L 63/1466 |
| 10,691,796 B1 | 6/2020 | Stolte et al. |
| 11,082,438 B2 | 8/2021 | Peinador et al. |

(Continued)

FOREIGN PATENT DOCUMENTS

| EP | 2893447 A2 | 7/2015 |
| EP | 3314437 A1 * | 5/2018 ............. G06F 9/322 |

(Continued)

OTHER PUBLICATIONS

International Search Report and Written Opinion dated Dec. 28, 2023 for PCT Patent Application No. PCT/IB2023/060256.

*Primary Examiner* — Tri M Tran
(74) *Attorney, Agent, or Firm* — MLO, a professional corp.

(57) ABSTRACT

A program is executed in a first mode of operation in a controlled environment in accordance with normal operations without malicious behavior. An acceptable behavior model is generated based on a plurality of sequences of events that occur during the normal operation of the program. The acceptable behavior model is indicative of normal behavior of the program that occurs during the normal operation. Then the program is executed in a second mode of operation in an operational environment. An operational sequence of events (determined during the second mode of operation) is compared with the acceptable behavior model. When there is a match between the operational sequence of events and the acceptable behavior model, execution in the second mode of operation continues. When there is not a match between the operational sequence of events and the acceptable behavior model, execution in the second mode of operation is halted.

24 Claims, 7 Drawing Sheets

(56) References Cited

U.S. PATENT DOCUMENTS

| | | |
|---|---|---|
| 11,106,799 B2* | 8/2021 | Keromytis ............ G06F 21/566 |
| 2013/0247180 A1 | 9/2013 | Camp |
| 2014/0165140 A1 | 6/2014 | Singla et al. |
| 2015/0309813 A1* | 10/2015 | Patel ..................... G06F 21/577 |
| | | 703/22 |
| 2017/0017789 A1 | 1/2017 | Daymont |
| 2017/0293477 A1 | 10/2017 | Takata et al. |
| 2018/0024911 A1 | 1/2018 | Kruszewski et al. |
| 2018/0107821 A1 | 4/2018 | Eshkenazi et al. |
| 2021/0288983 A1 | 9/2021 | Tambuluri et al. |
| 2022/0058077 A1 | 2/2022 | Stolfo et al. |
| 2022/0092179 A1 | 3/2022 | Zhang et al. |

FOREIGN PATENT DOCUMENTS

| | | |
|---|---|---|
| WO | 2019066099 A1 | 4/2019 |
| WO | 2020180887 A1 | 9/2020 |
| WO | 2023067665 A1 | 4/2023 |

* cited by examiner

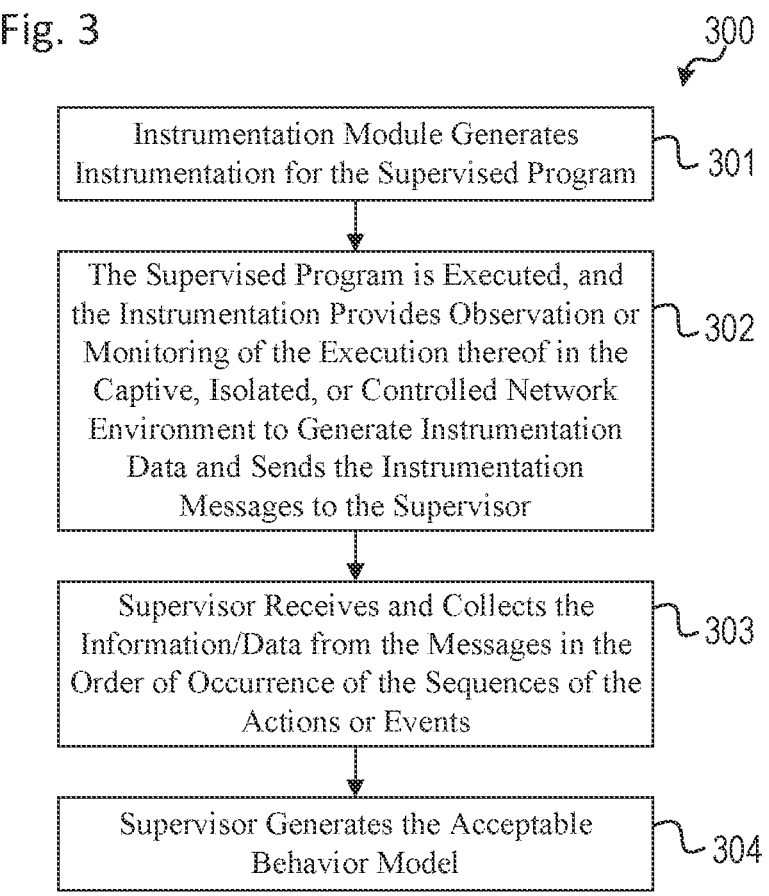

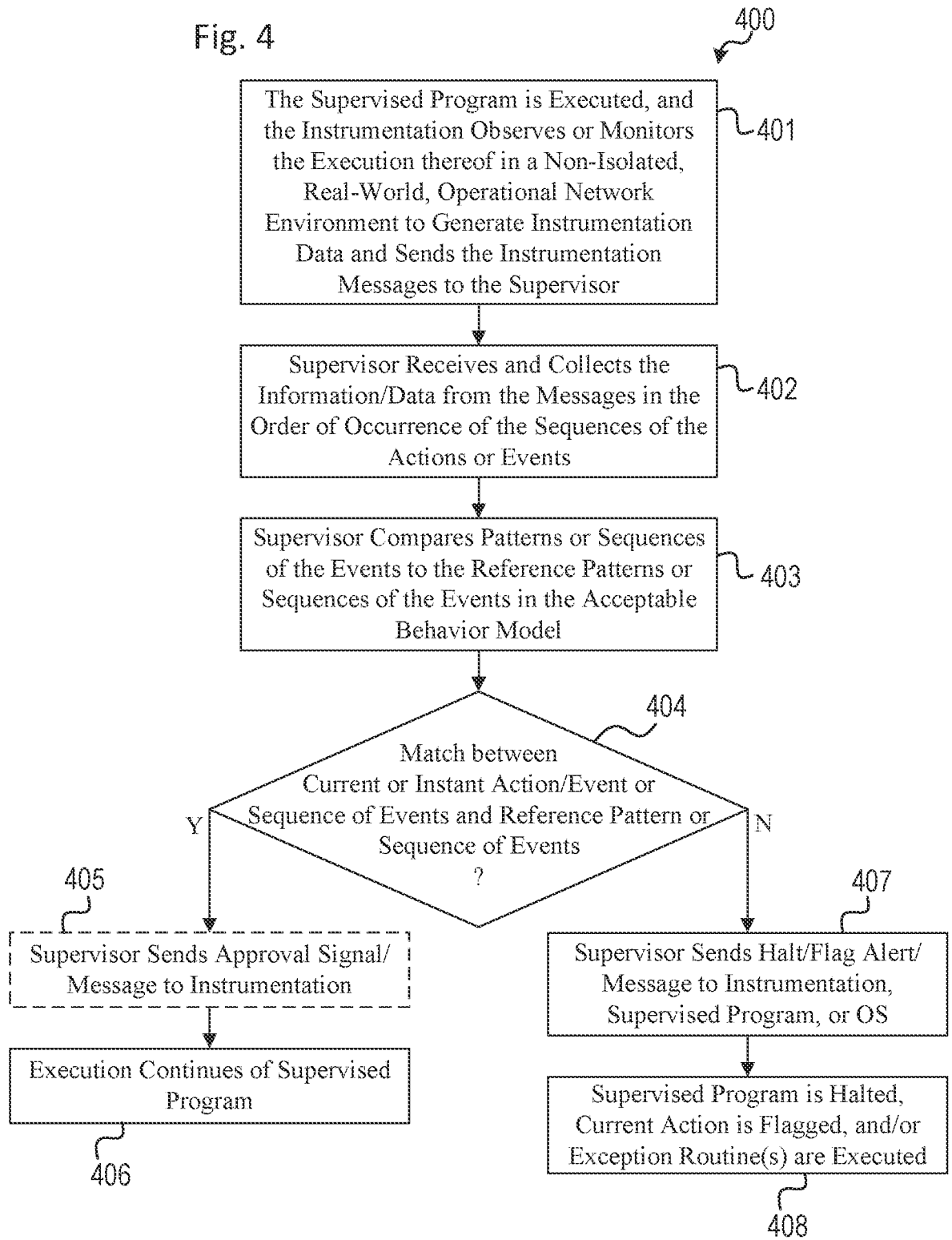

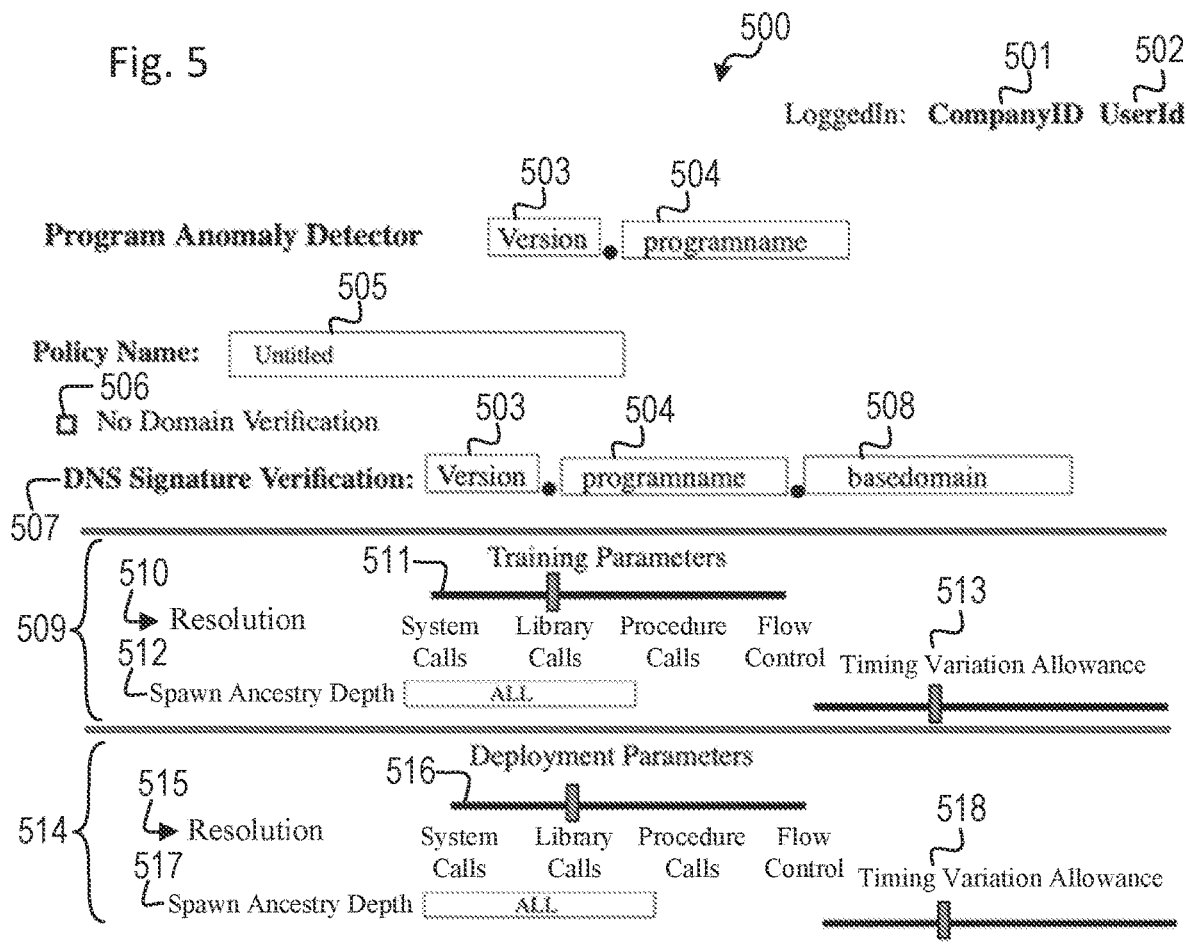

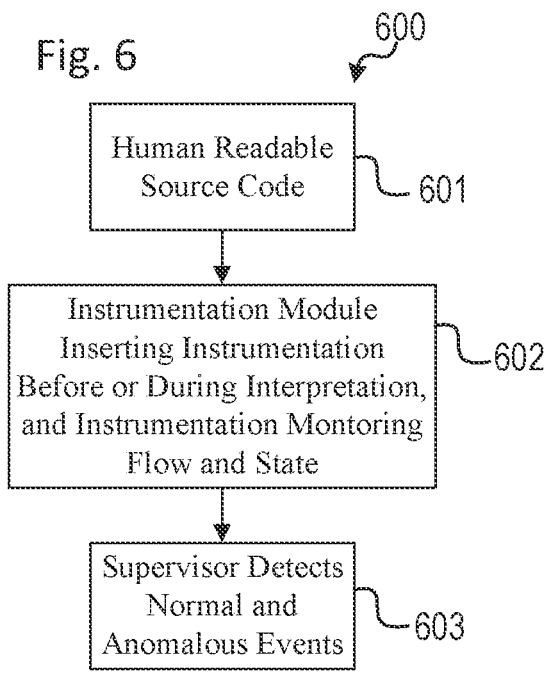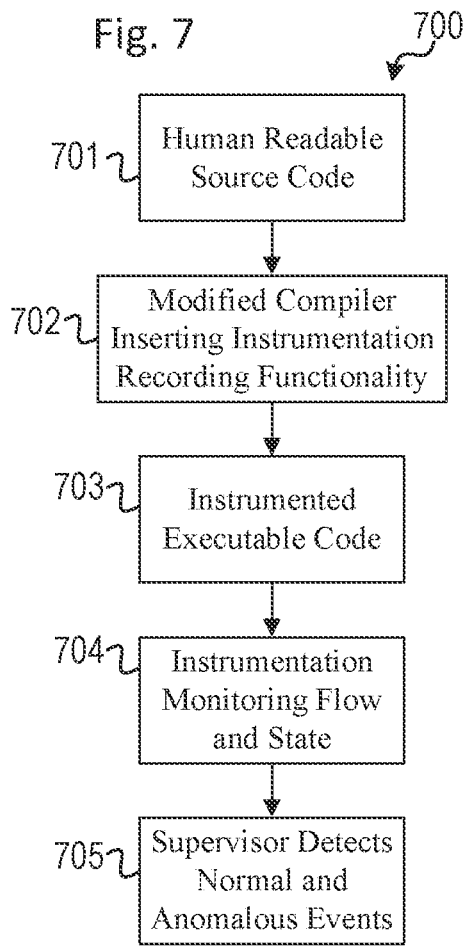

PROGRAM EXECUTION ANOMALY DETECTION FOR CYBERSECURITY

RELATED APPLICATIONS

This application claims priority to U.S. Provisional Patent Application No. 63/415,852, filed on Oct. 13, 2022, and entitled, "Program Execution Anomaly Detection System for Cyber Security", which is hereby incorporated by reference in its entirety and for all purposes.

BACKGROUND

Software programs are designed to perform certain expected functions and to operate in an expected manner. This expected performance and operation can be described as "normal operation". However, in relatively complex systems, errors, bugs, weaknesses, and/or vulnerabilities are inevitable and can make the program or computer system it is running on vulnerable to data leaks, malware, and other security breaches or malicious attacks. Conventional approaches to this problem may detect a security breach after it has happened, for example by monitoring for "big picture" anomalies, such as unusual network traffic, CPU usage, memory access, file usage, and/or data usage. Many of these approaches typically involve after-the-fact analysis of log-files, which may be too late to prevent the security breach or other erroneous or unanticipated operation from happening. Other conventional approaches may provide tools that can be used during software development, to analyze the code and identify weaknesses that could potentially be exploited by a malicious actor. For example, a development tool may scan the code, and look for vulnerability to known types of attacks. Still other conventional approaches may be able to detect certain known attacks, such as SQL injections, but cannot detect other behavior that is unanticipated, unintended, or potentially a security breach.

SUMMARY

In some aspects, the techniques described herein relate to a method (or a computerized system that performs the method) including: executing, by a computer system, a program in a first mode of operation in a controlled environment in accordance with a normal operation without malicious behavior; generating, by the computer system, a record of events including a plurality of sequences of events that occur during the normal operation of the program; generating, by the computer system using the record of events, an acceptable behavior model that is indicative of normal behavior of the program that occurs during the normal operation without the malicious behavior; executing, by the computer system, the program in a second mode of operation in an operational environment; determining, by the computer system, an operational sequence of events of the program during execution of the program in the second mode of operation, the operational sequence of events including a current action; comparing, by the computer system, the operational sequence of events with the acceptable behavior model; when the comparing step results in a match between the operational sequence of events and the acceptable behavior model, performing the current action in the second mode of operation; and when the comparing step does not result in the match between the operational sequence of events and the acceptable behavior model, not performing the current action and generating an alert to stop the executing of the program or to flag the current action in the second mode of operation at the current action.

In some aspects, the techniques described herein relate to a method (or a computerized system that performs the method) including: executing, by a computer system, a program in a first mode of operation in a controlled environment in accordance with a normal operation without malicious behavior; generating, by the computer system, a record of events including a plurality of sequences of events that occur during the normal operation of the program; and generating, by the computer system using the record of events, an acceptable behavior model that is indicative of normal behavior of the program that occurs during the normal operation without the malicious behavior; wherein: the acceptable behavior model is used to prevent execution of an current action of the program in a second mode of operation in an operational environment when it is determined that the current action of the program is part of an operational sequence of events that does not match the acceptable behavior model.

In some aspects, the techniques described herein relate to a method (or a computerized system that performs the method) including: receiving, by a computer system, an acceptable behavior model that is indicative of normal operation of a program without malicious behavior as determined by execution of the program in a first mode of operation in a controlled environment in accordance with the normal operation without malicious behavior; executing, by the computer system, the program in a second mode of operation in an operational environment; determining, by the computer system, an operational sequence of events of the program during execution of the program in the second mode of operation, the operational sequence of events including a current action; comparing, by the computer system, the operational sequence of events with the acceptable behavior model; when the comparing step results in a match between the operational sequence of events and the acceptable behavior model, performing the current action in the second mode of operation; and when the comparing step does not result in the match between the operational sequence of events and the acceptable behavior model, not performing the current action and generating an alert to stop the executing of the program or to flag the current action in the second mode of operation at the current action.

BRIEF DESCRIPTION OF THE DRAWINGS

FIG. 3 is a simplified flowchart of an example summary process for generating an acceptable behavior model for use in the detection system shown in FIG. 1, in accordance with some embodiments.

FIG. 4 is a simplified flowchart of an example summary process for monitoring a supervised program for abnormal behavior by the detection system shown in FIG. 1, in accordance with some embodiments.

FIG. 5 is a simplified user input/control interface for a user to input control parameters for the detection system shown in FIG. 1, in accordance with some embodiments.

FIG. 6 is a simplified flowchart of an example summary process for instrumenting and monitoring the supervised program that includes interpreted-language code by the detection system shown in FIG. 1, in accordance with some embodiments.

FIG. 7 is a simplified flowchart of an example summary process for instrumenting and monitoring the supervised program using a modified compiler by the detection system shown in FIG. 1, in accordance with some embodiments.

DETAILED DESCRIPTION

The present invention enables an improved system and/or method to detect when a supervised program is about to engage in unanticipated, abnormal, or malicious behavior, i.e., a software anomaly. Then it can halt execution of the supervised program before the unanticipated, abnormal, or malicious behavior can occur. Alternatively, the improved system and/or method may flag that behavior or a current function, action, or event. Thus, the improved system and/or method provides "program behavior enforcement". In some embodiments, the present invention detects deviations from normal behavior rather than explicitly malicious actions. In other words, the present invention does not determine what the supervised program could do in all situations, but what the supervised program should do only in normal situations.

Figure 1:
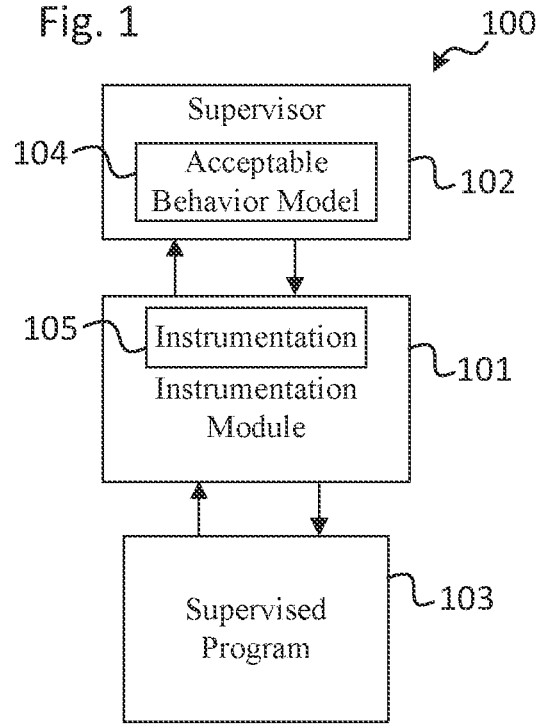
FIG. 1 is a simplified schematic block diagram of an improved program execution anomaly detection system, in accordance with some embodiments.

FIG. 1 is a simplified schematic block diagram of an improved program execution anomaly detection system (detection system) 100, in accordance with some embodiments. The detection system 100 generally includes an instrumentation module 101 and a supervisor (i.e., a sentry) 102 for detecting execution anomalies of a supervised program 103. The two main components (the instrumentation module 101 and the supervisor 102) work together to detect imminent unanticipated or abnormal behavior in the supervised program 103 and to halt, pause and/or flag execution thereof and/or execute one or more exception routines (e.g., that are specified or requested by the supervised program 103) before the unanticipated or abnormal behavior occurs.

In some embodiments, the instrumentation module 101 generates instrumentation 105 for the supervised program 103, so that the instrumentation 105 can communicate with the supervisor 102 to provide the supervisor 102 (i.e., a pattern detection unit and security system) with information about the behavior of the supervised program 103 (i.e., reports events or actions of the supervised program 103) during both a model-building mode (e.g., a training mode or learning mode) and an operation mode (or real-world execution mode or monitoring mode), as discussed below. Techniques for generating the instrumentation 105 by the instrumentation module 101 are discussed below.

In general, the instrumentation module 101 generates instrumentation for the supervised program 103, so that the instrumentation can generate and send to the supervisor 102 information about what the supervised program 103 is doing, i.e., events or actions being performed or about to be performed by the supervised program 103 during either the model-building mode (i.e., a first mode of operation in a controlled environment) or the operation mode (i.e., a second mode of operation in an operational environment). Each recorded event or action is provided in the sequence that they occur. Some examples of such actions or events may include, but not be limited to:

The supervised program 103 is calling a particular function with particular parameters;
The supervised program 103 is returning from a particular function with particular results; or
The supervised program 103 is throwing an exception of a particular kind.

During the model-building mode, the supervisor 102 receives these types of events, among others, from the instrumentation 105 and builds a "normal behavior" model or "acceptable behavior" model 104 (e.g., using artificial intelligence (AI), machine learning (ML), statistical analysis, and/or a heuristic compiler) based on patterns of behavior or sequences of the events that occur during normal operation of the supervised program 103. The acceptable behavior model 104 is, thus, indicative of normal behavior of the supervised program 103 that occurs during the normal operation without any attack, malicious behavior/actions, or anomalous events or in the absence of external hostile influences, i.e., it is a built-up picture of the types and range of flow control and other operating parameters which the supervised program 103 uses during the operation mode.

During the operation mode, the supervisor 102 receives these events from the instrumentation 105 and compares patterns or sequences of the events (i.e., operational events and operational sequences) to the acceptable behavior model 104, e.g., as inputs to an AI model, statistical analysis, and/or other appropriate pattern detection technique or combinations thereof. This comparison enables the supervisor 102 to determine whether the current or instant action or event or sequence of events matches a pattern or sequence of events that is known or expected to occur during normal operation or behavior of the supervised program 103 or that is known or expected to be representative of normal operation. Thus, the supervisor 102 performs this comparison to determine when there is a match and when there is no match. In some embodiments, this match need not be exact, but sufficiently close to be accepted as a match, as may be determined empirically during the model-building mode. With the instrumentation 105, therefore, execution of the instrumented supervised program 103 produces a series of signals or messages that indicate the flow control or the flow status within the executing instrumented supervised program 103, and these signals are monitored by the supervisor 102 and compared with the reference of the acceptable behavior model 104 to ascertain whether the instrumented supervised program 103 is executing within or outside expected limits.

When the comparison results in a match between an operational sequence of events and the acceptable behavior model 104, this indicates that no anomaly shall occur or has been detected, so the supervisor 102 generally takes no action in response thereto (or instructs the instrumentation 105 or the supervised program 103 to continue operation), thereby allowing the supervised program 103 to perform the current action or event in normal operation of the supervised program 103. On the other hand, when the comparison does not result in a match between the operational sequence of events and the acceptable behavior model 104 (i.e., the operational sequence of events deviates from the acceptable behavior model 104), this indicates that an anomaly (that would occur if execution of the supervised program 103 were to continue) has been detected. In this case, the supervisor 102 responds with an action to cause the supervised program 103 not to perform the current action or event. In some embodiments, the supervisor 102 generates an alert to stop or pause the execution of the program. Therefore, the supervisor 102 sends information back to the supervised program 103 or the instrumentation 105, for example (but not limited to), that the supervised program 103 should be terminated or paused during operation mode, the current action/event should be flagged, and/or one or more predetermined exception routines should be run (e.g., by the supervised program 103).

Conventional uses of instrumented executable code generally search for a known type of vulnerable or unsafe function/state or malicious action that could be performed by the code, e.g., as can be determined from a control flow graph and/or data flow model. The control flow graph or data flow model, for example, may be generated to attempt to determine all possible actions or events that a program could make or states that the program could enter in all situations. This enables analysis for potential vulnerabilities or attack vectors that a malicious actor could exploit. Then the program developer can debug the program by changing the code to make sure that the vulnerability does not show up in a final control flow graph, thereby removing or curing the vulnerability. Such conventional techniques require knowledge of characteristics of potential vulnerabilities or attack vectors, the structure of the program, and the full capabilities the program, so that the analysis of the control flow graph or data flow model can detect the potential vulnerabilities or attack vectors. The present invention, on the other hand, has the advantage of not requiring such knowledge, because the present invention is not explicitly looking for vulnerabilities, attack vectors, or potentially malicious actions in the code of the supervised program 103. Instead, the present invention beneficially looks for normal behavior of the supervised program 103, regardless of any potential vulnerabilities in the code, so that it can detect deviations from such normal behavior. In the model-building mode, the detection system 100 is not concerned with the full capabilities the supervised program 103 and might not encounter all possible actions, events, sequences or states that the supervised program 103 is potentially capable of. However, the actions, events, sequences or states that are encountered during the model-building mode would necessarily be part of normal operation, so that the acceptable behavior model 104 generated therefrom can be used to compare with operational events and operational sequences during the operation mode. In other words, the present invention detects deviations from normal behavior rather than explicitly malicious actions. Stated another way, the present invention does not determine what the supervised program 103 could do in all situations, but what the supervised program 103 should do only in normal situations.

Figure 2:
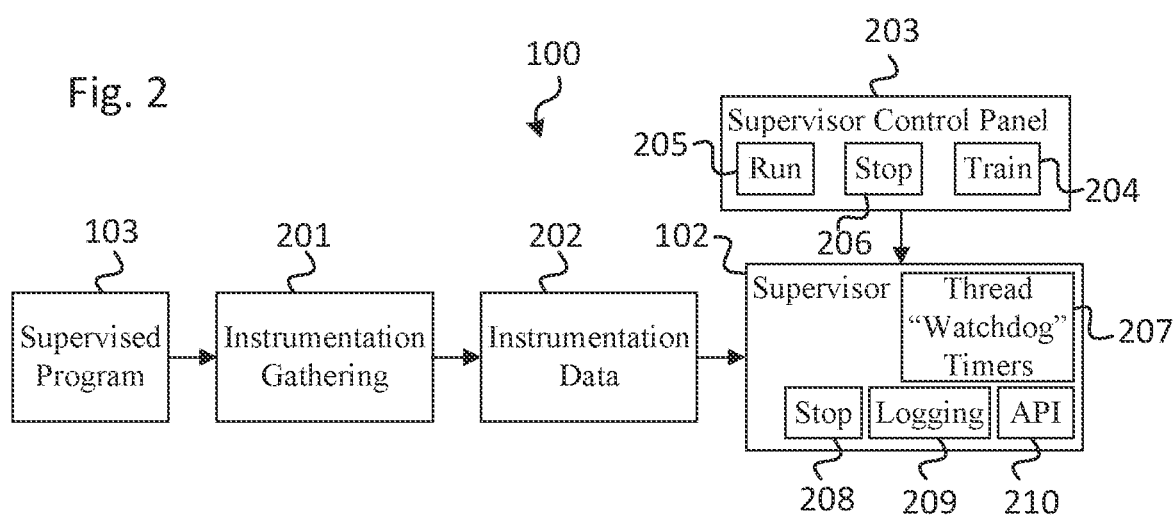
FIG. 2 is a simplified block diagram of functional modules for the detection system, in accordance with some embodiments.

In accordance with the above description, FIG. 2 is a simplified block diagram of functional modules for the detection system 100, in accordance with some embodiments. During the model-building mode and the operation mode, functions, actions, or events performed by the supervised program 103 are provided to an instrumentation gathering module 201 of the instrumentation 105. The instrumentation gathering module 201 gathers this information to produce instrumentation data 202. The instrumentation data 202 is provided by the instrumentation 105 to the supervisor 102.

A supervisor control panel 203 provides a "train" or "model-building" signal 204 to the supervisor 102 for the supervisor 102 to operate in the model-building mode to generate or train the acceptable behavior model 104. The supervisor control panel 203 also provides a "run" signal 205 to the supervisor 102 for the supervisor 102 to operate in the operation mode to detect anomalies in the actions or events of the supervised program 103 based on the acceptable behavior model 104. The supervisor control panel 203 also provides a "stop" signal 206 to the supervisor 102 for the supervisor 102 to terminate or pause operations by the supervised program 103, the instrumentation module 101, and/or the supervisor 102 in either mode.

The supervisor 102 includes thread timers 207 (e.g., "watchdog" timers) that are set for each thread or process being tracked to ensure that there is an expected response within an expected amount of time. This is used to ensure that the supervised program 103 is running the code as expected. The time duration of some or all of the timers 207 may be set by determining the length of time taken for observed or monitored functions, actions or events to be performed normally during the model-building mode, so that if one of the timers 207 exceeds the previously-determined duration during the operation mode, then this can indicate abnormal behavior or performance or interference with normal operation. In some cases, a response is expected from the instrumentation 105 within a time period monitored by the timers 207, and if the response is not received by the supervisor 102 within the time period, then the halt/termination/flag alert/message is generated as described below. The supervisor 102 also includes a "stop" command 208 that it sends to the instrumentation 105, the supervised program 103, a code interpreter, or the operating system to stop or pause the supervised program 103 (or thread or process thereof) for which the supervisor 102 has detected an anomaly. The supervisor 102 also includes a "logging" function 209 that it uses to provide a signal or record that an anomaly or unexpected behavior has occurred. The supervisor 102 also includes an "API" function 210 that it uses to allow external programs (e.g., via an application programming interface (API)) to perform a function with the supervised program 103 at a signaled state, thereby extending the usefulness of the supervisor 102. An example of such an external program may be a debugger application that can help a programmer understand why the anomaly occurred.

In some embodiments, communication between the instrumentation module 101 and the supervisor 102 preferably uses high bandwidth with low latency communications so as not to slow down the running of the supervised program 103 too noticeably. Suitable protocols for providing communication may involve, but are not limited to:

- A shared memory, wherein the supervisor 102 and the supervised program 103 are running on the same virtual machine (VM) and computing node;
- An inter-VM shared memory, wherein the supervisor 102 and the supervised program 103 are running on different VMs but both are running on the same computing node; or
- A high performance computing (HPC) interconnect (e.g., remote direct memory access (RDMA), InfiniBand (IB), RDMA over Converged Ethernet (RoCE), etc.), wherein the supervisor 102 and the supervised program 103 may be running on different VMs and different computing nodes as long as there is an HPC interconnect between them.

In some embodiments, the supervisor 102 can be running together with the instrumentation module 101, the supervised program 103, and the instrumentation 105 in the same process space, however, this is not ideal. Such an approach may expose the supervisor 102 to unlimited access by malicious code that has attacked the supervised program 103. In such a situation, it would be much easier for an unacceptable action by the supervised program 103 or malicious code to possibly circumvent the supervisor 102, thereby preventing detection of an execution anomaly. Thus, a preferred approach provides separation between, i.e., different process spaces for, the supervisor 102 and the instrumentation module 101 for security reasons.

Instrumentation Module

Implementation of the instrumentation module 101 generally depends on the technology which is used for the supervised program 103, e.g., interpreted languages or compiled languages. For example, the instrumentation module 101 for the supervised program 103 written in the Java programming language differs from the instrumentation module 101 for a program written in the JavaScript programming language which differs from the instrumentation module 101 for a program written in the Python programming language which differs from the instrumentation module 101 for a program written in one of the C or C++ programming languages and so on.

In some embodiments, for the supervised program 103 written in an interpreted or bytecode language, a modified code interpreter (which includes the instrumentation module 101) generates the instrumentation 105 while it is interpreting the code/program, so the instrumentation 105 includes an instrumented portion of executable code generated by the modified code interpreter using the instrumentation module 101. Alternatively, a code interpreter separate from the instrumentation module 101 can interpret code that has already been instrumented with the instrumentation 105 by the instrumentation module 101, so the instrumentation module 101 includes the capability to instrument the interpreted-language code, and the instrumentation 105 includes an instrumented portion of executable code generated by the code interpreter. In some embodiments, for the supervised program 103 written in a compiled language, previously compiled code is recompiled (or code is compiled initially) by a modified compiler (which includes the instrumentation module 101) to automatically add the instrumentation 105 to the generated executable code. In some embodiments, the instrumentation module 101 includes a hardware implementation (optionally in combination with instrumented code of the supervised program 103) that provides the instrumentation 105 to gather the instrumentation data from the executing code of the supervised program 103 and provide it to the supervisor 102. These embodiments are described in more detail below.

In addition, in some embodiments, virtual machines (VMs) or code interpreters provide instrumentation facilities for the instrumentation module 101 that could be used (e.g., an instrumentation API for Java) to generate the instrumentation 105. Instrumentation for these technologies, and in general, is well-understood in the art.

In some embodiments, the instrumentation module 101 identifies functions, events or actions and inserts extra code (i.e., instrumentation code included as the instrumentation 105) at entry, exit and exception points of the supervised program 103 for monitoring execution at these points. For example, this may be done upon compiling or interpreting the code of the supervised program 103 for compiled languages or interpreted languages, respectively. Alternatively, the hardware implementation detects or identifies instrumentation points or locations at which to generate instrumentation data. In some embodiments, the instrumentation module 101 may identify all functions, or a selected subset of the functions, for the insertion of the extra code. In some embodiments, program flow control is instrumented in the supervised program 103, along with parameters relevant to program control.

In some embodiments, when execution (during either the model-building mode or the operation mode) of the supervised program 103 encounters the extra code (by either instrumentation in the compiled code or instrumentation by the code interpreter), the extra code is executed. In so doing, the extra code (i.e., the instrumentation 105) generates and sends messages to the supervisor 102 that execution of the supervised program 103 has reached a given or predetermined point, action or event. Alternatively, the hardware implementation generates and sends the messages. Execution of the supervised program 103 is thus observed by the instrumentation 105. In general, the same types of observations are performed and messages are sent by the instrumentation 105 during both the model-building mode and the operation mode.

In the model-building mode, in some embodiments, there is typically no need for the supervisor 102 to send messages back to the instrumentation 105 or the instrumentation module 101, so the instrumentation 105 generally proceeds uninterrupted with execution of the supervised program 103. However, in other embodiments, the instrumentation 105 receives approvals for all requests or messages back from the supervisor 102. In the operation mode, in some embodiments, after each message is sent, depending on the configuration of the instrumentation 105, the instrumentation 105 may wait for approval from the supervisor 102 before continuing the execution to the next step, function, action or event of the code of the supervised program 103, so that the supervisor 102 can determine whether to immediately halt execution of the supervised program 103 before the instant action or event can be executed. In other embodiments, the instrumentation 105 may alternatively wait for such approval under some circumstances, for example after a predetermined number of messages, or only for certain functions, or may not wait for approval. In some embodiments, e.g., for performance reasons, if the instrumentation 105 is configured not to wait for approval, it may get a program termination/stop/kill/pause signal later, if the supervisor 102 subsequently determines that the supervised program 103 should not be allowed to keep running.

In some embodiments, it is anticipated that, for performance reasons, some types of functions that may appear in the code may not need instrumentation, e.g., functions that are purely computational and do not interact with the environment beyond the supervised program 103 itself. On the other hand, functions that interact with user input, or that control flow, are preferably instrumented. However, it is contemplated that some embodiments may involve instrumentation of the entire code of the supervised program 103.

During the model-building mode, the instrumentation module 101 runs the supervised program 103 using test cases, which are typically designed by programmers, developers, or users to test the supervised program 103, e.g., with expected normal user interactions, API interactions, file interactions, etc. with the supervised program 103. Additionally, the instrumentation module 101 runs the supervised program 103 (one or more times) as a normal operation in a captive, isolated, or controlled network environment (captive normal operation). In some embodiments, the captive normal operation is necessary, because the programmers, developers, or users might not anticipate all possible normal scenarios of operation with the design of the test cases, i.e., the test cases might not be "complete".

In the captive normal operation of the supervised program 103 as used in the model-building mode, the supervised program is tested, but the system is isolated from the outside environment, including, e.g., the public internet or other programs running on the same computer as that of the supervised program 103. In some embodiments, the model-building mode is conducted in isolation from external influences in an isolated captive network environment in order to avoid the risk of hostile, malicious or anomalous behavior being mistakenly recognized as, and then incorporated in the acceptable behavior model 104 as, acceptable or normal behavior. By monitoring in the isolated captive network environment, the model-building mode ensures that only valid operations can occur, hostile actions or influences are avoided, or the training remains "clean". Additionally, during the captive normal operation, the training can flag behavior that did not show up when running the test cases, thus providing information that can be used to generate more test cases, directed to this behavior. Using both the test cases and the captive normal operation of the supervised program 103 generally improves the ability of the supervisor 102 to monitor program flow and detect anomalies. Additionally, after the detection system 100 has generated the acceptable behavior model 104 in relation to a particular software package, set of packages and/or system configuration, the acceptable behavior model 104 can be propagated to other suitable or like detection systems 100 located elsewhere without the need for each such device, machine or system to be transported to the captive, isolated, or controlled network environment for training.

Supervisor

In some embodiments, the supervisor 102 can run in either mode: the model-building mode or the operation mode. In the model-building mode, the supervisor 102 is trained or taught to interpret and learn from the data of the sequences of events received from the instrumentation 105. In some embodiments, in this mode, the supervisor 102 approves all requests or messages from the instrumentation 105, and collects the event/sequence data provided by the instrumentation 105 to create the acceptable behavior model 104. The supervisor 102 generally builds an initial version of the acceptable behavior model 104 or enhances an existing version of the acceptable behavior model 104 for the supervised program 103.

In some embodiments, generating the acceptable behavior model 104 generally involves running representative test cases or examples of normal operation of the supervised program 103 by means of the instrumentation 105, so that the supervisor 102 can learn or establish an envelope of normal or acceptable operation thereof, i.e., a range of normal or acceptable behaviors. (In some embodiments, the acceptable behavior model 104 is generated or trained, using AI techniques, e.g., with statistical data, to determine whether the current or instant instruction or sequence of events is part of normal, acceptable or anticipated behavior.) In other words, the supervisor 102 uses the acceptable behavior model 104 to determine whether the current or instant instruction should be permitted to proceed to be executed or the supervised program 103 should be terminated. In an example, to make this determination, the acceptable behavior model 104 takes into account information such as the sequence of events (i.e., a window of events that includes the current or instant event and a sufficient number of preceding events), the function being called, and the input data for this function, among other possible parameters. Therefore, in the model-building mode, the instrumentation 105 sends messages to the supervisor 102 for normal network package transmissions/receipts, normal file reads/writes, normal database accesses, normal functions calls, and other appropriate normal actions or events that can be performed by the supervised program 103. The supervisor 102, thus, incorporates the data of these messages (as sequences of events at each instrumentation point or location in the execution of the code) into building the acceptable behavior model 104.

During the model-building mode, the supervisor 102 receives the messages of the functions, actions or events and builds the acceptable behavior model 104 based on the patterns of behavior or sequences of the events (i.e., building-mode events and building-mode sequences) for the control flow and/or data flow that occur during normal operation of the supervised program 103, i.e., without any attack, malicious behavior/actions, or anomalous events. These patterns or sequences, thus, become "known", "reference", "normal", or "correct" patterns or sequences that are known to occur during normal operation or behavior of the supervised program 103 or that are known to be representative of normal operation. The acceptable behavior model 104 is, thus, indicative of normal behavior of the supervised program 103 that occurs during the normal operation without any attack, malicious behavior/actions, or anomalous events. In some embodiments, the supervisor 102 uses AI to train or generate the acceptable behavior model 104 (i.e., a ML or AI model) based on the model-building-mode events and model-building-mode sequences. The model-building mode, thus, involves inputting multiple patterns or sequences of events to an AI system to train or generate the acceptable behavior model 104. In some embodiments, the acceptable behavior model 104 involves analyzing data developed or generated by the supervisor 102 for statistical analysis of events or sequences of events that the supervised program 103 may perform during normal operation. In some embodiments, the AI can include statistical analysis, artificial intelligence, or combination thereof.

After the acceptable behavior model 104 is developed, validated and tested in the model-building mode (which may be an iterative process and may use techniques known in the field), the detection system 100 is deployed to enforce program behavior in the operation mode wherever needed within any number of computerized systems. Therefore, many copies of the supervisor 102 may operate in the operation mode, each using a copy of the acceptable behavior model 104, to determine whether operation of the supervised program 103 is behaving normally or abnormally. During the operation mode, the supervisor 102 receives messages of actions or events from the instrumentation 105 and sends back approvals to continue operations and/or alerts (e.g., an out-of-range alert) to terminate, stop, or pause the executing of the supervised program 103. In some embodiments, termination occurs before the instant or current event or function (indicated in the most recent message) is performed, immediately after (i.e., before an immediately subsequent event or action) the instant or current event or function is performed, or relatively soon after the instant or current event or function is performed. Additionally, in some embodiments, in case of a termination signal, the supervisor 102 will preferably also execute operating system level program termination, e.g., to make sure that a potentially compromised supervised program is not allowed to continue to execute.

In some embodiments, the supervisor 102 determines whether the supervised program 103 should continue to operate or execute in light of the current message from the instrumentation 105 (i.e., the current point of execution of the supervised program 103) and the history or context of execution (i.e., the sequence of events which the supervised program 103 executed before the current point of execution). In this manner, the supervisor 102 does not analyze or observe each event in isolation from other events but within a context among other events and other data. In other words, the supervisor 102 analyzes the current event and the sequence of events (i.e., a number or "window" of sequential events) to which it belongs with either the AI model or the statistical analysis. Thus, the analysis by the supervisor 102 determines the event or events that happen in a given situation or state of the supervised program 103 or following a particular event or history, context, or sequence of events.

The number of events that the analysis uses to form each window or sequence of events (including the current or instant event and preceding events) may be configurable and may depend on a type of the current or instant event, the needs of the acceptable behavior model 104, the performance capabilities of the supervisor 102, and any other appropriate considerations. Additionally, for a relatively small number or short window or sequence of events (e.g., a number determined empirically), the sequence of events may generally be used as-is to generate the acceptable behavior model 104. On the other hand, for a relatively large number or long window or sequence of events (e.g., a number determined empirically), the sequence of events may be compressed using compression algorithms to generate the acceptable behavior model 104, so that during the operation mode, the comparison of operational events or sequences with the acceptable behavior model 104 can be done more quickly or efficiently. Different embodiments may or may not use such compression. Furthermore, when a sequence of events is found to be repeated by the supervised program 103, then this sequence of events can be stored only once for use in generating the acceptable behavior model 104, thereby reducing the size of the acceptable behavior model 104.

In some embodiments that use machine learning (ML) or artificial intelligence (AI) for the supervisor 102 to determine whether to continue operation or to terminate operation of the supervised program 103, the AI enables complex behavior (e.g., the anticipated or normal behavior of the supervised program 103) to be modeled, so as to recognize patterns in the sequences of events. The AI model, thus, enables the supervisor 102 to recognize a difference between the anticipated or normal behavior (learned during the model-building mode) and behavior that is not anticipated or normal (encountered during the operation mode). On the other hand, in some embodiments that use statistical analysis, the statistical analysis is used instead of, or as an adjunction to, the AI embodiment for modeling the anticipated or normal behavior. For relatively complex software, however, the AI embodiment is typically a more practical approach.

In the operation mode, for every message received from the instrumentation 105, the supervisor 102 uses the imminent behavior (i.e., the instruction or event that is about to be executed by the supervised program 103) and the history, input data, and/or other parameters mentioned above to determine whether the imminent behavior falls within a behavior or range of behaviors encapsulated by the acceptable behavior model 104. The supervisor 102 does this by comparing the sequence of events (including the current or instant event and a sufficient number of preceding events), the input data, etc. with the normal sequence of events in the acceptable behavior model 104. Then the supervisor sends either an approval message or signal for operations to continue with the instant event or an alert message or signal to terminate, stop, or pause the executing of the supervised program 103 and/or to execute one or more program-specified or program-requested exception routines. In this manner, in some embodiments, the supervisor 102 in the operation mode monitors and approves the received messages or a subset of the messages. In some embodiments, the supervisor 102 monitors the information in the received messages without sending approvals (i.e., the instrumentation 105 assumes approval) but sends the termination signal/alert upon detecting that the instant event is possibly an abnormal or unanticipated behavior. As an example, the supervisor 102 generates and sends the termination signal/alert when the supervisor 102 detects that an unanticipated flow-control operation has been called such as might be the case with malicious or rogue code (e.g., the result of malicious intent) or an unanticipated error within the application code (error in programming, which could permit a security breach). In this manner, the detection system 100 can prevent abnormal or unanticipated behavior or prevent execution of a current action of the program, thereby providing program behavior enforcement.

Alternatively, in some embodiments, the supervisor 102 may represent a learning supervisor and a monitoring supervisor that are physically and/or logically separate from each other. In this case, instead of the supervisor 102 being able to run in both of the two modes, the learning supervisor runs in the model-building mode, and the monitoring supervisor runs in the operation mode.

Summary of Model-Building Mode

Operations of the instrumentation module 101 and the supervisor 102 during the model-building mode have been described above. FIG. 3 is a simplified flowchart of an example summary process 300 for generating the acceptable behavior model 104 in the model-building mode, in accordance with some embodiments. The particular steps, combination of steps, and order of the steps for this process are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps. In addition, some of the functions (or alternatives for these functions) of the process have been described elsewhere herein.

At 301, the instrumentation module 101 generates the instrumentation 105 for the supervised program 103. For example, for the interpreted language embodiment, the instrumentation module 101 is provided with a modified code interpreter that generates executable code with instrumentation extra code that can interrupt the normal interpretation of the supervised program 103 at appropriate tap or instrumentation points or locations that the modified code interpreter detects, or the instrumentation module 101 generates instrumented code for the supervised program 103 with which a conventional code interpreter generates such executable code. For the compiled language embodiment example, the instrumentation module 101 compiles or recompiles the supervised program 103 and inserts the instrumentation extra code into the existing code of the supervised program 103. For the hardware implementation example, the instrumentation module 101 includes an adjunct processor sub-system that monitors the main processor that executes the supervised program 103, which may have instrumented code.

At 302, the supervised program 103 is executed in the normal manner that programs are executed, but with the enhancements of the instrumentation 105 with which the instrumentation data is generated and communicated to the supervisor 102. During such execution, the instrumentation 105 observes or monitors the execution of the supervised program 103 in the captive, isolated, or controlled network environment (in accordance with normal operation without malicious behavior or in the absence of external hostile influences) to generate instrumentation data (e.g., data indicative of the events). The instrumentation 105 then sends the instrumentation messages with the instrumentation data to the supervisor 102. In this manner, the instrumentation 105 generates a record of events including the sequences of events that occur during the normal operation of the supervised program 103. For example, for the interpreted language embodiment example, extra code in the executable code generated by the modified or conventional code interpreter generates the instrumentation data during normal execution of the supervised program 103 and sends messages of actions or events by the supervised program 103 to the supervisor 102. For the compiled language embodiment example, execution of the compiled code of the supervised program 103 results in execution of the instrumentation extra code, which sends messages of actions or events by the supervised program 103 to the supervisor 102. For the hardware implementation example, the adjunct processor sub-system detects appropriate instrumentation points or responds to instrumented code execution during the execution of the supervised program 103 by the main processor, gathers instrumentation data for the actions or events by the executing code, and provides it in the messages to the supervisor 102.

At 303, the supervisor 102 receives and collects the information/data from the messages in the order of occurrence of the sequences of the actions or events to thereby form such sequences. The supervisor 102 may also compress the data, consolidate repeated sequences, and/or otherwise prepare the data for input to generating the acceptable behavior model 104.

At 304, the supervisor 102 generates the acceptable behavior model 104 based on the collected information of the sequences of the actions or events (i.e., the record of events). This may be, for example, the training of the AI model, the generating of the statistical analysis model, or for another appropriate pattern detection technique. At this point, the acceptable behavior model 104 has been created and is ready for use in the operation mode. Afterwards, therefore, the supervisor 102 uses the acceptable behavior model 104 to monitor functions, actions, events, or sequences of events received in the instrumentation data to determine whether to allow continuation of operations of the supervised program 103, to pause, terminate or stop the executing of the supervised program 103, and/or to execute one or more program-specified or program-requested exception routines.

Summary of Operation Mode

Operations of the instrumentation module 101 and the supervisor 102 during the operation mode have been described above. FIG. 4 is a simplified flowchart of an example summary process 400 for monitoring the supervised program 103 for abnormal behavior in light of the acceptable behavior model 104 in the operation mode, in accordance with some embodiments. The particular steps, combination of steps, and order of the steps for this process are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps. In addition, some of the functions (or alternatives for these functions) of the process have been described elsewhere herein.

At 401, the supervised program 103 is executed in the normal manner that programs are executed. During such execution, the instrumentation 105 observes or monitors the execution of the supervised program 103 in a non-isolated, real-world, operational network environment (i.e., with or without unknown malicious behavior) to generate instrumentation data (e.g., data indicative of the events). The instrumentation 105 then sends the instrumentation messages with the instrumentation data to the supervisor 102. In other words, the instrumentation 105 detects or determines one or more actions or events (part of an operational sequence of events) of the supervised program 103 during execution of the supervised program 103 in the operation mode. In this manner, the instrumentation 105 generates a record of events for the sequences of events that occur during real-world operation of the supervised program 103, and the instrumentation 105 sends the record of events in the messages of actions or events by the supervised program 103 to the supervisor 102, during the operation mode in the same or similar manner as was performed at 302 during the model-building mode.

At 402, the supervisor 102 receives and collects the information/data from the messages in the order of occurrence of the sequences of the actions or events to thereby form such sequences. The supervisor 102 may also compress the data, consolidate repeated sequences, and/or otherwise prepare the data as needed for input to the acceptable behavior model 104.

At 403, the supervisor 102 compares patterns or sequences of the events (i.e., operational events or operational sequences of events) to the reference patterns or sequences of the events in the acceptable behavior model 104. This may be done, for example, as inputs to the AI model, statistical analysis, or other appropriate pattern detection technique.

At 404, based on the comparison at 403, the supervisor 102 determines whether there is a match between the current or instant action/event or sequence of events (i.e., the operational events or operational sequences of events) and a reference pattern or sequence of events (i.e., in the acceptable behavior model 104) that is expected or known to occur during normal operation or behavior of the supervised program 103. This may be done, for example, as an output from the AI model, statistical analysis, or other appropriate pattern detection technique.

At 405, when the determination at 404 is positive/yes (i.e., there is a match), the supervisor 102 either does nothing or sends an approval signal/message (shown in dashed lines as being optional) to the instrumentation 105 or the supervised program 103 to continue operations. Thus, operation or execution of the supervised program 103 continues (at 406), including performing the current or instant action/event.

At 407, when the determination at 404 is negative/no (i.e., there is no match), the supervisor 102 sends a halt/termination/flag alert/message to the instrumentation 105, the supervised program 103, or the operating system to pause, terminate or stop the executing of the supervised program 103 or of the current thread thereof, to flag the current action, and/or to execute one or more program-specified or program-requested exception routines. Thus, operation or execution of the supervised program 103 is terminated, halted, or paused or the current action is flagged (at 408), and the supervised program 103 does not perform the current or instant action/event, in response to the halt/termination/flag alert/message. In some embodiments, the supervised program 103 executes the one or more program-specified or program-requested exception routines. For example, to terminate the supervised program 103 or thread thereof, the supervisor 102 terminates the supervised program 103 or thread directly, runs a termination procedure, or calls a termination handler.

Thus, in some embodiments, in the operation mode, the instrumentation 105 is continually sending messages with events to the supervisor 102, and the supervisor 102 is continually evaluating or analyzing the events or sequences of events and the watchdog thread timers 207 to determine whether to allow the supervised program 103 to continue executing normally or to terminate the supervised program 103.

Sample Algorithms

The information or data in the messages sent by the instrumentation 105 to the supervisor 102 precisely identifies the location of the current or instant event, function, or line of code that is being or is about to be executed by the supervised program 103. Additionally, in some embodiments, the messages contain context information (e.g., thread ID, end user ID, etc.) that enable the supervisor 102 to discriminate between different logical execution flows. Such discrimination can be important because modern systems are usually non-sequential, i.e., handling multiple tasks or threads at the same time.

Within a given context (i.e., within a given execution thread), a sequence of messages from the instrumentation 105 describes the execution of the supervised program 103. This will be used to generate the acceptable behavior model 104 during the model-building mode. The algorithm for generating the acceptable behavior model 104 from the sequences of messages during the model-building mode generally depends on the algorithm for determining whether any sequence of events matches the acceptable behavior model 104 in the operation mode.

Options for this algorithm generally include at least two types of algorithms:

ML/AI based algorithms similar to the class of pattern recognition approaches that includes Large Language Models; and Statistical analysis algorithms with a lookup structure of prefixes.

Both types of algorithms have different structures and characteristics. However, both are used to make the same determination of whether a current prefix belongs to the acceptable behavior model 104. In this context, "prefix" means the sequence of events that includes the current event and a limited sequence of events directly preceding the current event.

The ML/AI based approaches may result in the acceptable behavior model 104 being smaller and the performance of the monitoring by the supervisor 102 being faster. However, these advantages may come at the cost of more complex training and/or a higher number of false negatives (i.e., detecting no anomaly when one has occurred) and/or false positives (i.e., detecting an anomaly when one has not occurred).

The lookup structure produced from the statistical analysis algorithms may be simpler to construct and result in a smaller number of false positives and false negatives. However, this may come at the potential cost of a larger model and bigger performance impact in monitoring during operation mode.

The above-described operation of the detection system 100 differs from conventional approaches that monitor for unusual "big picture" anomalies, such as unusual network traffic, CPU usage, memory access, file usage, data usage, etc. Such conventional approaches necessarily detect a security breach after it has already occurred, rather than provide a means to halt execution before the breach happens. Additionally, such conventional approaches typically assume knowledge of potential attack vectors, malware capabilities, or vulnerabilities; whereas, the detection system 100 has the advantage of not having to assume such knowledge, so the detection system 100 generates knowledge of normal acceptable behavior without regard to potential attack vectors in the code, malware capabilities, or vulnerabilities in the code.

Supervisor Controls

FIG. 5 is a simplified user input/control interface (UI) 500 for a user to input control parameters to the supervisor 102 for operating in the model-building mode and the operation mode, in accordance with some embodiments. The particular control parameters, combination of control parameters, and order of the control parameters for this data structure are provided for illustrative purposes only. Other embodiments could use different control parameters, combinations of control parameters, or orders of control parameters to achieve the same or similar result. The example UI 500 generally illustrates an example of a possible implementation of an API or user interface to permit clients, programmers, developers, or users (with appropriate training) to run the detection system 100 and to provide appropriate code-signing for assurance purposes. Other examples may include other types of controls or control parameters.

A company ID parameter 501 and user ID parameter 502 identify the developer (e.g., a person or entity) that is logged in to and is using the detection system 100. Each registered developer creates a master company ID for the company ID parameter 501. This is an internal item only and is never displayed in the signing of an application. Additionally, the user ID parameter 502 is unique to each registered developer.

The supervisor 102 (i.e., "program anomaly detector") is provided with a version parameter 503 and a program name parameter 504. The version parameter 503 identifies the version of the supervised program 103 as set by the developer. The program name parameter 504 identifies the name of the supervised program 103 as also set by the developer and is unique to each developer.

A policy name parameter 505 (currently "Untitled") is a name (internal to the developer) to enable the developer to identify or remember a particular set of rules or parameters that have been specified in the user input/control interface 500. Thus, the developer can have different sets of rules, each identified by a different policy name parameter 505, with which to experiment with different parameters for the model-building mode and the operation mode for the supervised program 103.

A "no domain verification" check box 506 is provided for the registered developer to select whether the program is verified and signed. If the check box 506 is selected, then the supervised program 103 is verified and signed using a domain that is internal to and controlled by an operator/owner of the detection system 100 to protect uniqueness of the domain.

If the check box 506 is not selected, then the supervised program 103 is verified and signed in this manner. Instead, the supervised program 103 is verified with DNS signature verification 507 with DNS records and a special server. The special server can be accessed via a URL formed with the version parameter 503 (filled in automatically as provided above), the program name parameter 504 (filled in automatically as provided above), and a verified base domain 508 that can be set only by the owner or manager of the base domain (typically the registered developer). In this manner, ownership or providence of the supervised program 103 is proven.

A training parameters section 509 is provided for setting parameters used during the model-building mode for generating the acceptable behavior model 104. For example, first resolution parameters 510 set the amount of data that the instrumentation module 101 creates the instrumentation 105 to generate and send, e.g., system calls, library calls, procedure calls, and/or flow control, among other types of data. In some embodiments, this is set by a first slider bar 511 (shown as being set to the library calls).

For example, if system calls data is selected (e.g., when the first slider bar 511 is set above "System Calls"), then data only for system calls will be generated and sent by the instrumentation 105 and used by the supervisor 102 in the model-building mode. If library calls data is selected (e.g., when the first slider bar 511 is set above "Library Calls" as shown), then data for system calls and library calls will be generated and sent by the instrumentation 105 and used by the supervisor 102 in the model-building mode. If procedure calls data is selected (e.g., when the first slider bar 511 is set above "Procedure Calls"), then data for system calls, library calls, and procedure calls will be generated and sent by the instrumentation 105 and used by the supervisor 102 in the model-building mode. If flow control data is selected (e.g., when the first slider bar 511 is set above "Flow Control"), then data for system calls, library calls, procedure calls, and flow control will be generated and sent by the instrumentation 105 and used by the supervisor 102 in the model-building mode. Alternatively, in some embodiments, check boxes (instead of the first slider bar 511) can be used to individually select each of the first resolution parameters 510. On the other hand, in some embodiments, the supervisor 102 may be instructed (e.g., with another check box) that test cases are being used, in which case the supervisor 102 will use all data that can be generated.

Additionally, if the supervised program 103 spawns threads or additional processes, as is common with multi-threaded applications, a first spawn ancestry depth parameter 512 sets how many to monitor or a depth to which to monitor, so that the instrumentation module 101 can create the appropriate instrumentation 105 for these threads or processes. In some embodiments, this parameter is set to monitor "all" (as shown) spawned threads or processes, e.g., by default, or any other desired or appropriate depth. Furthermore, a first timing variation allowance parameter 513 may be used to set a resolution to record timing.

A deployment parameters section 514 is provided for setting parameters used when the detection system 100 is deployed during the operation mode, e.g., for the instrumentation 105 to generate operational events and operational sequences, and/or for the supervisor 102 to select which operational events and operational sequences to be monitored when using the acceptable behavior model 104 to determine whether any sequence of events matches the acceptable behavior model 104 and to determine whether to allow the supervised program 103 to continue executing normally or to terminate the supervised program 103. For example, second resolution parameters 515 set the amount of data that is to be generated and gathered by the instrumentation 105 and used by the supervisor 102, e.g., system calls, library calls, procedure calls, and/or flow control, among other types of data. In some embodiments, this is set by a second slider bar 516 (shown as being set to the library calls). Alternatively, in some embodiments, check boxes (instead of the slider bar 516) can be used to individually select each of the resolution parameters 515.

In some embodiments, the second resolution parameters 515 are set by the second slider bar 516 in a manner similar to that of the first resolution parameters 510 and first slider bar 511 in the training parameters section 509. Therefore, if the second resolution parameters 515 selected for the operation mode are the same as the first resolution parameters 510 selected for the model-building mode (i.e., if the second slider bar 516 is set to the same resolution parameters as the first slider bar 511), then the instrumentation 105 will generate and send and the supervisor 102 will collect and use in the operation mode the same types of data that were generated, sent, collected, and used in the model-building mode. However, if the second resolution parameters 515 selected for the operation mode are fewer than the first resolution parameters 510 selected for the model-building mode (i.e., if the second slider bar 516 is set to fewer resolution parameters than that of the first slider bar 511), then the instrumentation 105 will generate and send and the supervisor 102 will collect and use in the operation mode only the selected types of data (i.e., as indicated by the second slider bar 516) and not any additional types of data that were generated, sent, collected, and used in the model-building mode. In other words, in this case, the operation mode will use a subset of the data that was used in the model-building mode. On the other hand, if the second resolution parameters 515 selected for the operation mode are more than the first resolution parameters 510 selected for the model-building mode (i.e., if the second slider bar 516 is set to more resolution parameters than that of the first slider bar 511), then this appears to indicate that additional data could be used in the operation mode that was not used in the model-building mode. However, in this case, the instrumentation 105 will generate and send and the supervisor 102 will collect and use in the operation mode only the same types of data that were generated, sent, collected, and used in the model-building mode. In other words, the acceptable behavior model 104 would not work with any additional data that was not used to generate it. Therefore, regardless of the selection of the second resolution parameters 515 (i.e., the setting of the second slider bar 516), the detection system 100 will generate, send, collect, and use in the operation mode the type of data selected only if it was also generated, sent, collected, and used in the model-building mode.

Additionally, if the supervised program 103 spawns threads or additional processes, a second spawn ancestry depth parameter 517 sets how many to monitor or a depth to which to monitor. In some embodiments, this parameter is set to monitor "all" (as shown) spawned threads or processes, e.g., by default, or any other desired or appropriate depth. Furthermore, a second timing variation allowance parameter 518 may be used to set a resolution to record timing, which indicates how much slack is allowed in timing during runtime before the thread timers 207 indicate that there has not been an expected response within an expected amount of time.

Modified Code Interpreter

For the supervised program 103 written in an interpreted or bytecode language (e.g., such as but not limited to PHP (recursive acronym for PHP: Hypertext Preprocessor), Ruby, Python, and JavaScript), there is no need to compile code. Instead, in some embodiments, a modified code interpreter (which includes the instrumentation module 101) generates the instrumentation 105 while it is interpreting the code to generate instrumented executable code for execution. In other embodiments, the instrumentation module 101 instruments the interpreted-language code, and a code interpreter generates instrumented executable code for execution. A conventional code interpreter, by comparison, may be used to execute, emulate or debug interpreted code. Conventional debugging, however, generally requires foreknowledge of types of vulnerabilities or potential attacks. The present invention, on the other hand, has the advantage of not requiring such knowledge.

FIG. 6 is a simplified flowchart of an example summary process 600 for instrumenting and monitoring the supervised program 103 that includes interpreted-language code, in accordance with some embodiments. The particular steps, combination of steps, and order of the steps for this process are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps. In addition, some of the functions (or alternatives for these functions) of the process have been described elsewhere herein.

The process 600 generally starts (at 601) with the human readable source code of the supervised program 103, which is a traditional way of writing instructions for program execution. At 602, the instrumentation module 101 inserts the instrumentation 105 before or during the interpretation, so the instrumentation 105 can monitor flow and state information. Therefore, in some embodiments, the modified code interpreter inserts instrumentation 105 during interpretation of the lines of code of the source code. In this manner, the modified code interpreter also monitors flow and state data. The modified code interpreter, therefore, is a separate program that not only interprets the code written for the supervised program 103 (as is usually done by a conventional code interpreter) but also monitors the instructions, actions or events of the code for appropriate instrumentation points. The modified code interpreter, thus, installs the necessary tap points on-the-fly during interpretation and execution to generate the instrumentation data needed to observe the execution of the supervised program 103. With each line of code, therefore, the modified code interpreter interprets the code and determines whether instrumentation data needs to be generated (and sent to the supervisor 102) for the current action or event before executing it. Alternatively, at 602, the instrumentation module 101 instruments the interpreted-language code, so that the code interpreter generates the executable code to include portions of executable instrumentation code (i.e., the instrumentation 105) and portions of executable regular code of the supervised program 103. Additionally, time durations for the watchdog thread timers 207 may also be determined at this point. Then the supervisor 102 detects (at 603) normal and anomalous events.

Modified Compiler

In some embodiments, previously compiled code for a compiled-language supervised program 103 is recompiled (or code is compiled for the first time) by a modified compiler that incorporates the instrumentation module 101. The modified compiler uses the instrumentation module 101 to automatically add instrumentation instructions to the source code before generating the compiled executable code. (Additionally, in some embodiments for some compiled languages, operating system facilities may be used by the instrumentation 105 (e.g., ptrace available for the Linux operating system), or calls to shared libraries may be intercepted by the instrumentation 105.)

FIG. 7 is a simplified flowchart of an example summary process 700 for instrumenting and monitoring the supervised program 103 using a modified compiler, in accordance with some embodiments. The particular steps, combination of steps, and order of the steps for this process are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps. In addition, some of the functions (or alternatives for these functions) of the process have been described elsewhere herein.

The process 700 generally starts (at 701) with the human readable source code of the supervised program 103. At 702, the modified compiler uses the instrumentation module 101 to insert instrumentation recording functionality and then compiles the source code to generate the executable code, which includes the instrumentation 105. Thus, in addition to creating a machine code interpretation of the human readable source code, the modified compiler adds the flow and state recording functionality to generate the instrumented executable code 703. The instrumented executable code 703 is run by a hardware processor in the manner that the developer or programmer would expect, while at same time sending state and flow information to the supervisor 102. At 704, the instrumentation 105 in the instrumented executable code 703 monitors the flow and state of the execution of the instrumented executable code 703. At 705, the supervisor 102 detects normal and anomalous events and flags flow anomalies and/or state anomalies.

Hardware Implementation

A hardware implementation generally has the potential to be faster and more efficient than the software-only embodiments. In some hardware implementation embodiments, the instrumentation module 101 instruments the supervised program 103 similarly to, but not as extensively as in, the modified code interpreter or modified compiler embodiments, but the operation of the instrumentation 105 and the supervisor 102 is accelerated by a separate adjunct processor sub-system linked to a main processor system that is executing the supervised program 103. In some hardware implementation embodiments, the adjunct processor sub-system receives signals on all or a portion of the I/O pins of the main processor with which to determine the actions of the main processor as it is executing the supervised program 103 and then to determine the instrumentation data to be generated based on these actions. In the model-building mode and the operation mode, the adjunct processor sub-system gathers the instrumentation data from the (optionally instrumented) executing code of the supervised program 103, and provides it to the supervisor 102, which may be implemented in software.

In some embodiments, the adjunct processor sub-system is as tightly linked as possible to the main processor system. For example, the adjunct processor sub-system could be incorporated in custom integrated circuit (IC) chip (e.g., via a design portability schema such as HDL), a separate computing device, or a plug-in card with appropriate bus access. Additionally, in some embodiments, the adjunct processor sub-system uses a RAM/ROM and/or EEPROM or equivalent that is independent from that of the main processor system.

Figure 8:
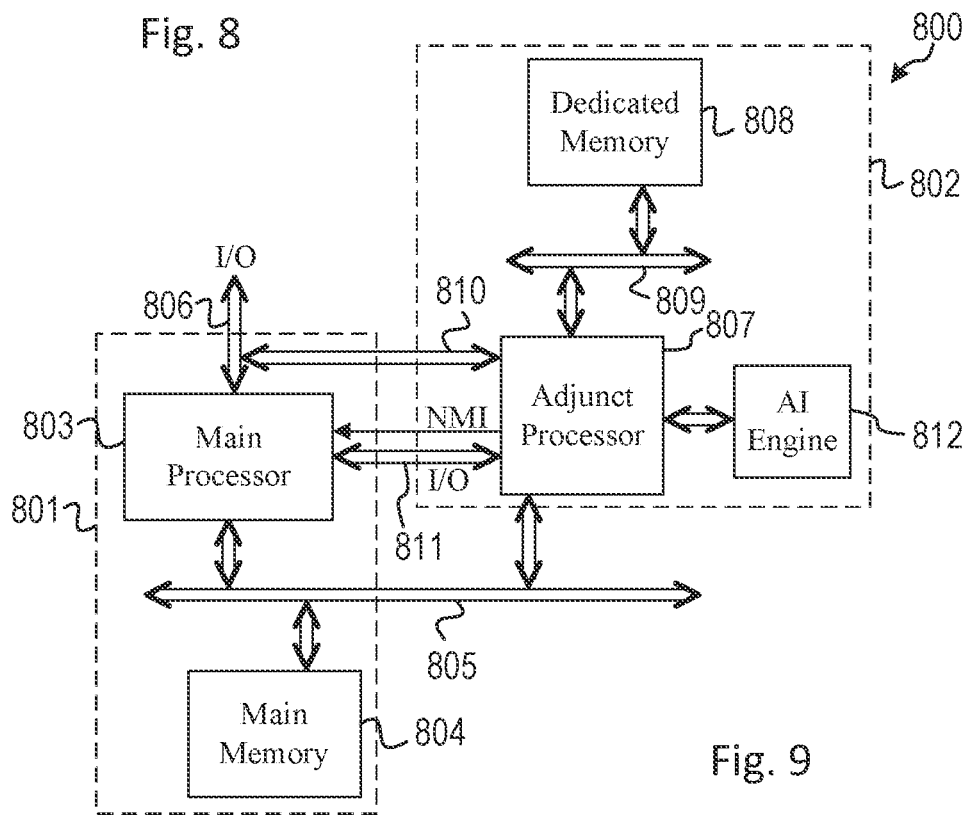
FIG. 8 is a simplified block diagram of a computing system of an example hardware implementation for the detection system shown in FIG. 1, in accordance with some embodiments.

In some embodiments, at a high level, an example hardware implementation may comprise an adjunct processor sub-system, either collocated in the same IC chip or on the same printed circuit board (PCB) with the main processor system or located off-board in the form of a daughterboard attached (directly or indirectly) to the PCB of the main processor system or a separate computing device from that containing the main processor system. FIG. 8 is a simplified block diagram of a computing system 800 of an example hardware implementation having a main processor system 801 and an adjunct processor sub-system 802, in accordance with some embodiments.

The main processor system 801 generally includes a main processor (CPU) 803, a main memory 804, a communication bus 805, and an input/output (I/O) subsystem 806, among other appropriate components not shown for simplicity. The adjunct processor sub-system 802 generally includes an adjunct processor 807, a dedicated memory 808 (e.g., volatile and/or non-volatile), a dedicated communication bus 809, a first dedicated I/O bus 810 for communication with the I/O subsystem 806, a second dedicated I/O bus 811 for direct communication with the main processor 803, and an AI engine 812, among other appropriate components not shown for simplicity.

In some embodiments, the adjunct processor sub-system 802 executes the instrumentation module 101 and the supervisor 102. Thus, the hardware implementation of the detection system 100 is not dependent on the main processor system 801 for operating instructions, except for the optional instrumentation of the supervised program 103. In some hardware embodiments with instrumentation of the supervised program 103, the adjunct processor sub-system 802 monitors events that are flagged by the instrumentation 105. (The optional instrumentation in the supervised program 103 in combination with related operation of the adjunct processor 807, therefore, forms the instrumentation 105 of FIG. 1 in some of the hardware implementation embodiments for generating the instrumentation data for use by the supervisor 102.) The optional instrumentation helps to reduce the load on the adjunct processor 807 and increase the speed at which decisions can be made in the operation mode. Therefore, the adjunct processor 807 detects program flow control changes (i.e., instrumentation data) as indicated by the instrumentation running on the main processor system 801 and uses those inputs for the supervisor 102 to build the acceptable behavior model 104 in the model-building mode and to monitor the supervised program 103 in the operation mode. In some embodiments without the added optional instrumentation, the adjunct processor sub-system 802 may monitor every instruction executed by the main processor system 801, e.g., by snooping signals on the I/O pins thereof. Additionally, in some embodiments, the second dedicated I/O bus 811 is a dedicated I/O channel that enables the supervisor 102 to have access to the internal state, pipeline, and internal registers of the main processor 803 to monitor control signals and observe some actions of the supervised program 103, e.g., to detect when a branch is about to occur and determine whether it is normal or abnormal. Additionally, the AI engine 812 may be a separate hardware component (e.g., a co-processor) from the adjunct processor 807 or a software module running on the adjunct processor 807. The AI engine is used by the supervisor 102 to build the acceptable behavior model 104 in the model-building mode and to monitor the supervised program 103 in the operation mode. Additionally, the watchdog thread timers 207 are implemented in the adjunct processor 807.

The main processor system 801 and the adjunct processor sub-system 802 are both connected through the communication bus 805 to the main memory 804. The main memory 804 contains the supervised program 103 and provides the code through the communication bus 805 to the main processor 803 for execution thereof in the normal manner of a conventional computing system. The main memory 804 also provides the code of the supervised program 103 through the communication bus 805 to the adjunct processor 807 for monitoring thereof.

In the model-building mode and the operation mode, the adjunct processor sub-system 802 monitors the instrumented execution of the supervised program 103 by the main processor system 801. Thus, the monitored data received by the adjunct processor 807 includes the instructions of the compiled instrumented code of the supervised program 103 (via the communication bus 805), copies of memory accesses caused by the execution of the supervised program 103 (via the communication bus 805), copies of I/O accesses from the I/O subsystem 806 caused by the execution of the supervised program 103 (via the dedicated I/O bus 810), and control signals or instructions received through the second dedicated I/O bus 811. With this data, the instrumentation 105 (executing under operations of the adjunct processor 807) generates the instrumentation data and sends it to the supervisor 102 (also operating on the adjunct processor 807), which stores it (via the dedicated communication bus 809) in the dedicated memory 808.

In some embodiments, the adjunct processor sub-system 802 enters the model-building mode in response to a command received via a dedicated I/O port. In the model-building mode, the adjunct processor sub-system 802 (in accordance with operation of the instrumentation 105) monitors the instrumented execution of the supervised program 103 by the main processor system 801, preferably configured in an isolated captive environment in order that only valid operations can occur. Then, in some embodiments, the adjunct processor sub-system 802 (in accordance with operation of the supervisor 102) uses the instrumentation data stored in the dedicated memory 808 in the AI engine 812 to generate the acceptable behavior model 104. The acceptable behavior model 104 is stored by the supervisor 102 in the dedicated memory 808, rather than in the main memory 804.

Since a sub-system AI engine is used to process the instrumentation data generated by the instrumentation 105 and collected by the supervisor 102, this data can be processed faster and with greater confidence of low false-alarm rate (i.e., the false positives mentioned above) for a given range of test cases than would be possible with alternative training approaches. This process generates the acceptable behavior model 104, which may be refined and improved as the result of more information gathered during the operation mode. In some embodiments, the adjunct processor sub-system 802 is programmed to enable upload, via a secure interface, of operational metrics for the acceptable behavior model 104 derived from a physically separate captive isolated test-bed, thereby permitting rapid deployment of learned metrics to a number of such systems.

In the operation mode, the adjunct processor sub-system 802 similarly monitors the instrumented operation of the main processor system 801 as provided by the instrumentation 105. Thus, in the operation mode, the adjunct processor sub-system 802 (running the supervisor 102) takes each received input of instrumentation data, in particular but not limited to flow change operations, actions or events, and considers at each step whether such an operation matches "normal operation" using the acceptable behavior model 104, as described above. If the operation does not match the normal or anticipated operation or does not match the normal or anticipated range of operation per the acceptable behavior model 104, the adjunct processor sub-system 802 uses a non-maskable interrupt (NMI) and/or its I/O connection (e.g., via 806, 810, and/or 811) with the main processor system 801 to halt the operation, flag the operation as out of anticipated range, and/or execute one or more program-specified or program-requested exception routines. The non-maskable interrupt ensures that the halt cannot be defeated. Additionally, the second dedicated I/O bus 811 enables the supervisor 102 to provide interrupt instructions to the main processor 803 to take appropriate action upon receiving the NMI and halting the supervised program 103 or a thread thereof, so that potentially malicious code cannot take control of operations of the main processor 803.

Therefore, the hardware implementation is similar to the approaches described above in relation to the modified code interpreter implementation and the modified compiler implementation with the exceptions that: a) any load on the main processor system 801 is minimised; b) the model-building mode can be expected to go faster; and c) the detection system 100 will operate with a greater degree of integrity, since it is not reliant on the underlying operating system or application code of the main processor system 801. Additionally, as in all implementations, the generation of the acceptable behavior model 104 is performed in the absence of knowledge (or disclosure) of the code used in the supervised program 103, except for some embodiments that include certain instrumentation features in order to take advantage of the capabilities of the adjunct processor sub-system 802.

Figure 9:
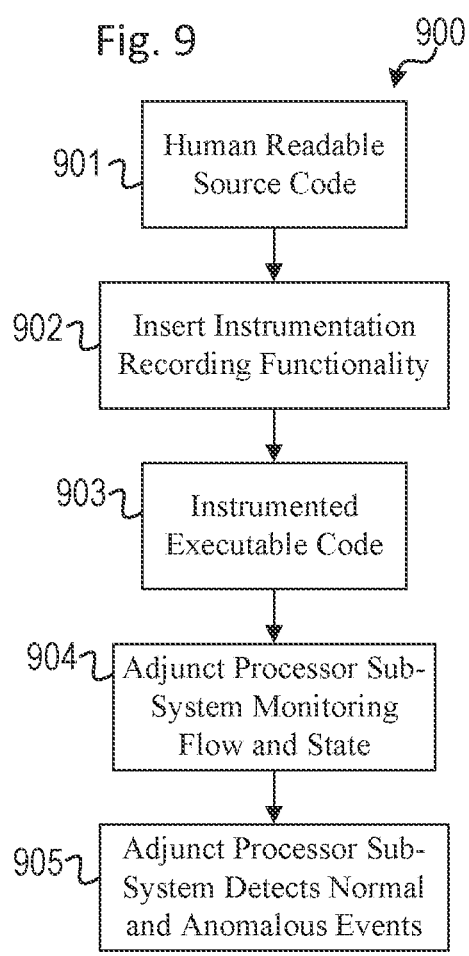
FIG. 9 is a simplified flowchart of an example summary process for instrumenting and monitoring the supervised program using the hardware implementation for the detection system shown in FIG. 1, in accordance with some embodiments.

FIG. 9 is a simplified flowchart of an example summary process 900 for instrumenting and monitoring the supervised program 103 using a hardware implementation, in accordance with some embodiments. The particular steps, combination of steps, and order of the steps for this process are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps. In addition, some of the functions (or alternatives for these functions) of the process have been described elsewhere herein.

The process 900 generally starts (at 901) with the human readable source code of the supervised program 103. At 902, in some embodiments, instrumentation recording functionality is inserted into the source code similar to step 702 for the modified compiler implementation above. Thus, the flow and state recording functionality is added to the compiled machine code interpretation of the human readable source code to generate (instrumented) executable code 903. In other embodiments, on the other hand, the executable code 903 does not include instrumentation, because the adjunct processor sub-system 802 is configured to handle the functions that generate the instrumentation data. The executable code 903 (whether instrumented or not) is run by the main processor system 801 in the manner that the developer or programmer would expect. At 904, the adjunct processor sub-system 802 (by executing the instrumentation 105) monitors the flow and state of the execution of the executable code 903. At 905, the adjunct processor sub-system 802 (by executing the supervisor 102) detects normal and anomalous events, flags flow anomalies and/or state anomalies, halts execution of the executable code 903, and/or executes one or more program-specified or program-requested exception routines.

Figure 10:
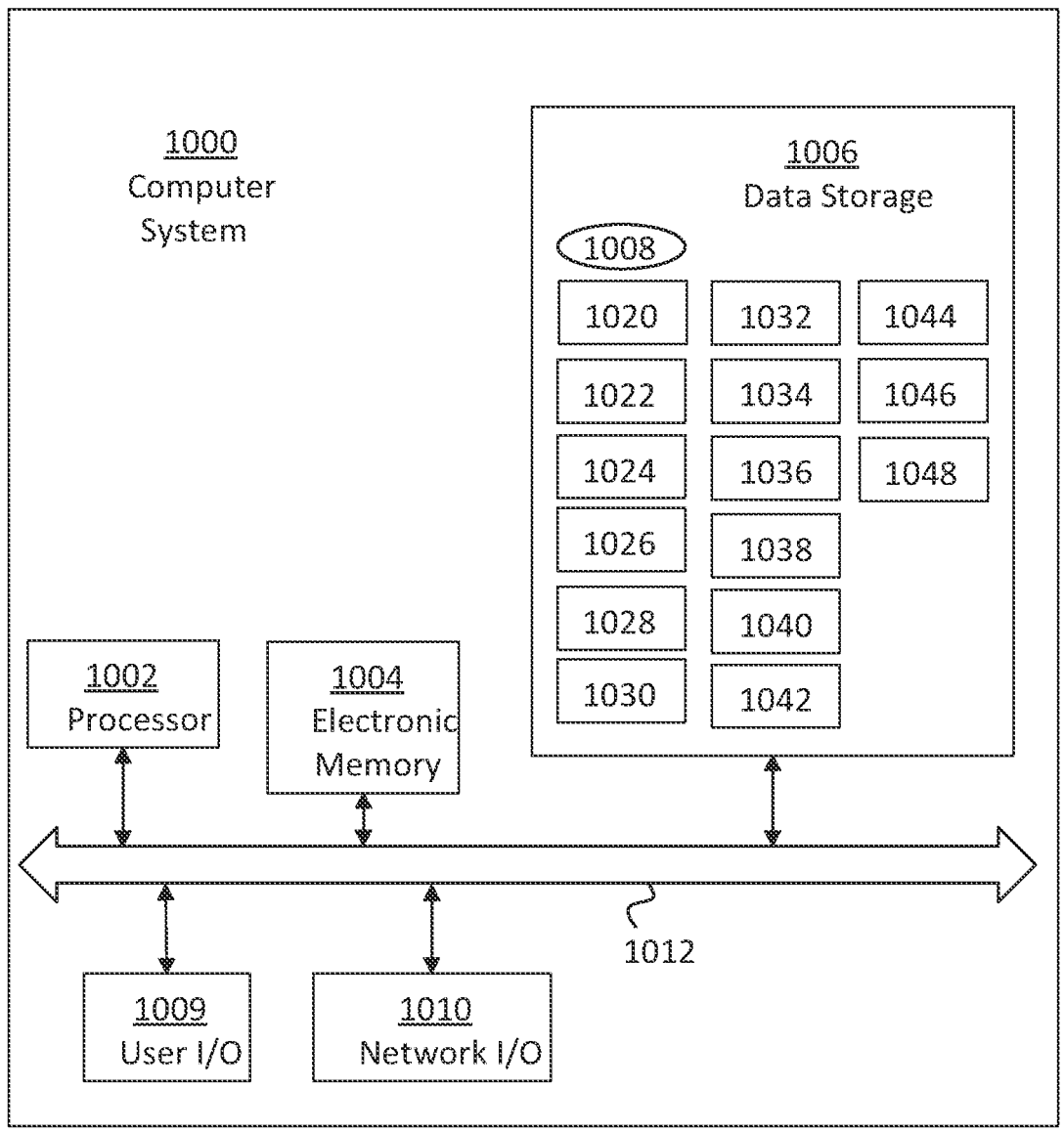
FIG. 10 is a simplified schematic diagram showing an example computer system for use in the detection system shown in FIG. 1, in accordance with some embodiments.

FIG. 10 is a simplified schematic diagram showing an example computer system 1000 (representing any combination of one or more of the computer systems) for use in the detection system 100 for executing any of the software programs described herein, in accordance with some embodiments. Other embodiments may use other components and combinations of components. For example, the computer system 1000 may represent one or more physical computer devices or servers, such as web servers, rack-mounted computers, network storage devices, desktop computers, laptop/notebook computers, etc., having one or more processors or one or more processor cores, depending on the complexity of the detection system 100. In some embodiments implemented at least partially in a cloud network potentially with data synchronized across multiple geolocations, the computer system 1000 may be referred to as one or more cloud servers. In some embodiments, the functions of the computer system 1000 are enabled in a single computer device. In more complex implementations, some of the functions of the computing system are distributed across multiple computer devices, whether within a single server farm facility or multiple physical locations, and whether implemented on computer systems having the same or dissimilar architectures or types of processors. Thus, where the claims recite a "computer system" or "computerized system", it is understood that this may refer to any of these embodiments.

In some embodiments where the computer system 1000 represents multiple computer devices or systems, some of the functions of the computer system 1000 are implemented in some of the computer devices, while other functions are implemented in other computer devices. For example, various portions of the detection system 100 can be implemented on the same computer device or separate computer devices, regardless of whether the computer devices have the same or dissimilar architectures or types of processors.

In the illustrated embodiment, the computer system 1000 generally includes at least one processor 1002, at least one main electronic memory 1004, at least one data storage 1006, at least one user I/O 1009, and at least one network I/O 1010, among other components not shown for simplicity, connected or coupled together by a data communication subsystem 1012.

The processor 1002 represents one or more central processing units, computer processors, co-processors, processor cores, or clusters of processors, in one or more IC chips, on one or more PCBs (printed circuit boards), and/or in one or more housings or enclosures. In some embodiments, the processor 1002 represents multiple microprocessor units in multiple computer devices at multiple physical locations interconnected by one or more data channels. Thus, where the claims recite a "processor", it is understood that this may refer to any of these embodiments. Additionally, when executing computer-executable instructions for performing the above-described functions of the computer system 1000 (i.e., the detection system 100) in cooperation with the main electronic memory 1004, the processor 1002 becomes a special purpose computer for performing the functions of the instructions.

The main electronic memory 1004 represents one or more RAM modules on one or more PCBs in one or more housings or enclosures. In some embodiments, the main electronic memory 1004 represents multiple memory module units in multiple computer devices at multiple physical locations. In operation with the processor 1002, the main electronic memory 1004 stores the computer-executable instructions executed by, and data processed or generated by, the processor 1002 to perform the above-described functions of the computer system 1000 (i.e., the detection system 100).

The data storage 1006 represents or comprises any appropriate number or combination of internal or external physical mass storage devices, such as hard drives, optical drives, network-attached storage (NAS) devices, flash drives, etc. In some embodiments, the data storage 1006 represents multiple mass storage devices in multiple computer devices at multiple physical locations. The data storage 1006 generally provides persistent storage (e.g., in a non-transitory computer-readable or machine-readable medium 1008) for the programs (e.g., computer-executable instructions) and data used in operation of the processor 1002 and the main electronic memory 1004. The non-transitory computer readable medium 1008 includes instructions (e.g., the programs and data 1020-1048) that, when executed by the processor 1002, cause the processor 1002 to perform operations including the above-described functions of the computer system 1000 (i.e., the detection system 100).

In some embodiments, the main electronic memory 1004 and the data storage 1006 include all, or a portion of the programs and data (e.g., represented by 1020-1048) required by the processor 1002 to perform the methods, processes and functions disclosed herein (e.g., in FIGS. 1-9). Under control of these programs and using this data, the processor 1002, in cooperation with the main electronic memory 1004, performs the above-described functions for the computer system 1000 (i.e., the detection system 100).

The user I/O 1009 represents one or more appropriate user interface devices, such as keyboards, pointing devices, displays, etc. In some embodiments, the user I/O 1009 represents multiple user interface devices for multiple computer devices at multiple physical locations. A system administrator, for example, may use these devices to access, set up, and control the computer system 1000.

The network I/O 1010 represents any appropriate networking devices, such as network adapters, etc. for communicating throughout the detection system 100. In some embodiments, the network I/O 1010 represents multiple such networking devices for multiple computer devices at multiple physical locations for communicating through multiple data channels.

The data communication subsystem 1012 represents any appropriate communication hardware for connecting the other components in a single unit or in a distributed manner on one or more PCBs, within one or more housings or enclosures, within one or more rack assemblies, within one or more geographical locations, etc.

Reference has been made in detail to embodiments of the disclosed invention, one or more examples of which have been illustrated in the accompanying figures. Each example has been provided by way of an explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:
   executing, by a computer system, a program in a first mode of operation in a controlled environment in accordance with a normal operation without malicious behavior;
   generating, by the computer system, a record of events comprising a plurality of sequences of events that occur during the normal operation of the program;
   generating, by the computer system using the record of events, an acceptable behavior model that is indicative of normal behavior of flow control, flow status, or data flow of actions performed by the program that occur during the normal operation without the malicious behavior;
   executing, by the computer system, the program in a second mode of operation after the program has been deployed in runtime in a non-isolated, real-world, operational network environment;
   determining, by the computer system, an operational sequence of events of the program during execution of the program in the second mode of operation, the operational sequence of events including a current action;
   comparing, by the computer system, the operational sequence of events with the acceptable behavior model;
   when the comparing step results in a match between the operational sequence of events and the acceptable behavior model, performing the current action in the second mode of operation; and
   when the comparing step does not result in the match between the operational sequence of events and the acceptable behavior model, not performing the current action and generating an alert to stop the executing of the program.

2. The method of claim 1, wherein:
   each sequence of events of the plurality of sequences of events comprises a plurality of events that occur during the normal operation of the program.

3. The method of claim 1, wherein:
   the program is written in an interpreted language; and
   the method further comprises;
   instrumenting code of the program to include instrumented code; and
   interpreting the program by a code interpreter to generate a first portion of executable code that is based on the code of the program and a second portion of executable code that is based on the instrumented code.

4. The method of claim 3, wherein:
the executing of the program in the first mode of operation and in the second mode of operation is performed after interpreting the program by the code interpreter; and
the generating of the record of events is performed by executing the second portion of executable code.

5. The method of claim 3, wherein:
the instrumenting of the code of the program to include the instrumented code is performed before the program is provided to the code interpreter.

6. The method of claim 3, wherein:
the instrumenting of the code of the program to include the instrumented code is performed by the code interpreter while interpreting the code of the program.

7. The method of claim 1, further comprising:
instrumenting, by the computer system using a compiler, code of the program, the program containing instrumented executable code;
wherein:
the executing of the program in the first mode of operation results in the generating of the record of events in accordance with instrumentation of the instrumented executable code of the program.

8. The method of claim 1, wherein:
the executing of the program in the first mode of operation is performed by a first processor of the computer system;
the generating of the record of events is performed by a second processor separate from the first processor.

9. The method of claim 1, wherein:
the executing of the program in the second mode of operation is performed by a first processor of the computer system;
the determining of the operational sequence of events is performed by a second processor of the computer system separate from the first processor.

10. The method of claim 1, wherein:
the acceptable behavior model is an artificial intelligence model trained on the plurality of sequences of events, which are known to occur during the normal operation of the program without the malicious behavior.

11. A method comprising:
executing, by a computer system, a program in a first mode of operation in a controlled environment in accordance with a normal operation without malicious behavior;
generating, by the computer system, a record of events comprising a plurality of sequences of events that occur during the normal operation of the program; and
generating, by the computer system using the record of events, an acceptable behavior model that is indicative of normal behavior of flow control, flow status, or data flow of actions performed by the program that occur during the normal operation without the malicious behavior;
wherein:
the acceptable behavior model is configured to be used to prevent execution of a current action of the program in a second mode of operation after the program has been deployed in runtime in a non-isolated, real-world, operational network environment when it is determined that the current action of the program is part of an operational sequence of events that does not match the acceptable behavior model.

12. The method of claim 11, wherein:
each sequence of events of the plurality of sequences of events comprises a plurality of events that occur during the normal operation of the program.

13. The method of claim 11, wherein:
the program is written in an interpreted language; and
the method further comprises instrumenting code of the program to include instrumented code;
the method further comprises interpreting the program by a code interpreter to generate a first portion of executable code that is based on the code of the program and a second portion of executable code that is based on the instrumented code;
the executing of the program in the first mode of operation and in the second mode of operation is performed after interpreting the program by the code interpreter; and
the generating of the record of events is performed by executing the second portion of executable code.

14. The method of claim 11, further comprising:
instrumenting, by the computer system using a compiler, code of the program, the program containing instrumented executable code;
wherein:
the executing of the program in the first mode of operation results in the generating of the record of events in accordance with instrumentation of the instrumented executable code of the program.

15. The method of claim 11, wherein:
the executing of the program in the first mode of operation is performed by a first processor of the computer system;
the generating of the record of events is performed by a second processor of the computer system separate from the first processor.

16. The method of claim 11, wherein:
the acceptable behavior model is an artificial intelligence model trained on the plurality of sequences of events, which are known to occur during the normal operation of the program without the malicious behavior.

17. A method comprising:
receiving, by a computer system, an acceptable behavior model that is indicative of normal operation of flow control, flow status, or data flow of actions performed by a program without malicious behavior as determined by execution of the program in a first mode of operation in a controlled environment in accordance with the normal operation without malicious behavior;
executing, by the computer system, the program in a second mode of operation after the program has been deployed in runtime in a non-isolated, real-world, operational network environment;
determining, by the computer system, an operational sequence of events of the program during execution of the program in the second mode of operation, the operational sequence of events including a current action;
comparing, by the computer system, the operational sequence of events with the acceptable behavior model;
when the comparing step results in a match between the operational sequence of events and the acceptable behavior model, performing the current action in the second mode of operation; and
when the comparing step does not result in the match between the operational sequence of events and the acceptable behavior model, not performing the current action and generating an alert to stop the executing of the program.

18. The method of claim 17, wherein:
the program is written in an interpreted language; and
the method further comprises instrumenting code of the program to include instrumented code;
the method further comprises interpreting the program by a code interpreter to generate a first portion of executable code that is based on the code of the program and a second portion of executable code that is based on the instrumented code;
the executing of the program in the second mode of operation is performed after interpreting the program by the code interpreter; and
the determining of the operational sequence of events is performed by executing the second portion of executable code.

19. The method of claim 17, wherein:
the program contains instrumented executable code; and
the executing of the program in the second mode of operation results in the generating of the operational sequence of events in accordance with instrumentation of the instrumented executable code of the program.

20. The method of claim 17, wherein:
the executing of the program in the second mode of operation is performed by a first processor of the computer system;
the determining of the operational sequence of events is performed by a second processor of the computer system separate from the first processor.

21. A computerized system comprising:
a physical memory storing executable instructions; and
a hardware processor, coupled to the memory, that performs a method by executing the instructions stored in the memory, the method comprising:
receiving, by a computer system, an acceptable behavior model that is indicative of normal operation of flow control, flow status, or data flow of actions performed by a program without malicious behavior as determined by execution of the program in a first mode of operation in a controlled environment in accordance with the normal operation without malicious behavior;
executing, by the computer system, the program in a second mode of operation after the program has been deployed in runtime in a non-isolated, real-world, operational network environment;
determining, by the computer system, an operational sequence of events of the program during execution of the program in the second mode of operation, the operational sequence of events including a current action;
comparing, by the computer system, the operational sequence of events with the acceptable behavior model;
when the comparing step results in a match between the operational sequence of events and the acceptable behavior model, performing the current action in the second mode of operation; and
when the comparing step does not result in the match between the operational sequence of events and the acceptable behavior model, not performing the current action and generating an alert to stop the executing of the program.

22. The computerized system of claim 21, wherein:
the program is written in an interpreted language; and
the method further comprises instrumenting code of the program to include instrumented code;
the method further comprises interpreting the program by a code interpreter to generate a first portion of executable code that is based on the code of the program and a second portion of executable code that is based on the instrumented code;
the executing of the program in the second mode of operation is performed after interpreting the program by the code interpreter; and
the determining of the operational sequence of events is performed by executing the second portion of executable code.

23. The computerized system of claim 21, wherein:
the program contains instrumented executable code; and
the executing of the program in the second mode of operation results in the generating of the operational sequence of events in accordance with instrumentation of the instrumented executable code of the program.

24. The computerized system of claim 21, wherein:
the executing of the program in the second mode of operation is performed by a first processor of the computer system;
the determining of the operational sequence of events is performed by a second processor of the computer system separate from the first processor.

* * * * *